(12) United States Patent
Tanaka et al.

(10) Patent No.: US 11,014,537 B2
(45) Date of Patent: May 25, 2021

(54) COMMUNICATION MONITORING DEVICE, COMMUNICATION MONITORING SYSTEM, AND COMMUNICATION MONITORING METHOD

(71) Applicant: KOMATSU LTD., Tokyo (JP)

(72) Inventors: Tsuyoshi Tanaka, Tokyo (JP); Koichi Shima, Tokyo (JP); Naohiko Kikuchi, Tokyo (JP); Masahiro Kurihara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/618,207

(22) PCT Filed: Jul. 20, 2018

(86) PCT No.: PCT/JP2018/027289
§ 371 (c)(1),
(2) Date: Nov. 29, 2019

(87) PCT Pub. No.: WO2019/087476
PCT Pub. Date: May 9, 2019

(65) Prior Publication Data
US 2020/0114874 A1    Apr. 16, 2020

(30) Foreign Application Priority Data

Oct. 31, 2017  (JP) ............................ JP2017-210799

(51) Int. Cl.
*B60R 25/24*    (2013.01)
*B60W 50/02*    (2012.01)
(Continued)

(52) U.S. Cl.
CPC .......... *B60R 25/241* (2013.01); *B60W 50/02* (2013.01); *G06F 21/30* (2013.01); *G06F 21/55* (2013.01); *G06F 2221/2141* (2013.01)

(58) Field of Classification Search
CPC .................................................... B60R 25/241
See application file for complete search history.

(56) References Cited

U.S. PATENT DOCUMENTS 7,042,334 B2 * 5/2006 Mosgrove ........... E05B 19/0005
340/5.73
9,329,588 B2 * 5/2016 Simpson ................ G05B 19/00
(Continued)

FOREIGN PATENT DOCUMENTS

JP    A-2012-224239    11/2012
JP    A-2013-069124    4/2013
(Continued)

*Primary Examiner* — K. Wong
(74) *Attorney, Agent, or Firm* — Fish & Richardson P.C.

(57) ABSTRACT

A distribution information acquisition unit is configured to acquire distribution information including identification information of a user as a distribution destination of setting information which is used for access to a work vehicle. An access information acquisition unit is configured to acquire access information including identification information of the user who accesses the work vehicle. A fraudulence determination unit is configured to compare the identification information related to the access information with the identification information related to the distribution information to determine whether or not fraudulent access has occurred.

10 Claims, 11 Drawing Sheets

(51) Int. Cl.
    *G06F 21/30*     (2013.01)
    *G06F 21/55*     (2013.01)

(56) References Cited

U.S. PATENT DOCUMENTS

| | | | |
|---|---|---|---|
| 9,781,107 B2 * | 10/2017 | White | G06Q 10/00 |
| 10,313,134 B2 * | 6/2019 | Smith | H04L 9/3271 |
| 10,755,508 B2 * | 8/2020 | Ghorpade | G07C 9/00571 |
| 2017/0187707 A1 * | 6/2017 | Miu | H04L 63/0861 |
| 2018/0216318 A1 | 8/2018 | Shike | |
| 2019/0092282 A1 * | 3/2019 | Stanfield | G07C 9/00857 |

FOREIGN PATENT DOCUMENTS

| | | |
|---|---|---|
| JP | A-2014-071707 | 4/2014 |
| WO | WO 2017/061515 | 4/2017 |

* cited by examiner

FIG. 4

| MANGEMENT GROUP:G1 | | | |
|---|---|---|---|
| WORK VEHICLE ID | SETTING INFORMATION ID | SSID | ENCRYPTION KEY |
| A | #103 | AAAAAA | Aaaaaa |
| B | #201 | BBBBBB | Bbbbbb |
| ⋮ | ⋮ | ⋮ | ⋮ |

FIG. 5

| MANAGEMENT GROUP:G1 | | | | |
|---|---|---|---|---|
| USER ID | PASSWORD | AUTHORITY INFORMATION | MAIL ADDRESS | WORK VEHICLE ID |
| U1 | ******** | Admin | u1@g1.com | – |
| U2 | ******** | Manager | u2@g1.com | A, B, C, ..... |
| U3 | ******** | User | u3@g1.com | – |
| ⋮ | ⋮ | ⋮ | ⋮ | ⋮ |

FIG. 6

| WORK VEHICLE ID | SETTING INFORMATION ID | USER ID |
|---|---|---|
| A | #101 | U1, U4, ⋯⋯ |
| A | #102 | U1, U2, ⋯⋯ |
| B | #201 | U1, U3, ⋯⋯ |
| ⋮ | ⋮ | ⋮ |

| ACCESS TIME | USER ID | COMMUNICATION CONTENT |
|---|---|---|
| YYYY/MM/DD hh:mm:ss | U1 | POSITION INFORMATION |
| YYYY/MM/DD hh:mm:ss | U2 | FUEL INFORMATION |
| YYYY/MM/DD hh:mm:ss | U1 | WORK EQUIPMENT ATTITUDE INFORMATION |
| ⋮ | ⋮ | ⋮ |

COMMUNICATION MONITORING DEVICE, COMMUNICATION MONITORING SYSTEM, AND COMMUNICATION MONITORING METHOD

CROSS-REFERENCE TO RELATED APPLICATIONS

This application claims priority to International Application No. PCT/JP2018/027289 filed on Jul. 20, 2018, which claims priority to Japanese Patent Application No. 2017-210799, filed on Oct. 31, 2017. The contents of the prior applications are incorporated herein in their entirety.

TECHNICAL FIELD

The present invention relates to a communication monitoring device, a communication monitoring system, and a communication monitoring method.

BACKGROUND ART

Patent Document 1 discloses that in a construction management system, a construction management information device mounted on a work vehicle and a management server share information and construction management information stored in the management server is viewed with a mobile device.

CITATION LIST

Patent Literature

[Patent Document 1] Pamphlet of International Publication No. 2017/061515

DISCLOSURE OF INVENTION

Technical Problem

When the work vehicle and the mobile terminal are connected by wireless communication, it is desired to detect fraudulent access when there is the fraudulent access to the work vehicle.

An aspect of the present invention is to provide a communication monitoring device, a communication monitoring system, and a communication monitoring method, capable of detecting fraudulent access to a work vehicle.

Solution to Problem

According to a first aspect of the present invention, there is provided a communication monitoring device including a distribution information acquisition unit that is configured to acquire distribution information including setting information used for access to a work vehicle and identification information of a user to whom the setting information is distributed; an access information acquisition unit that is configured to acquire access information including identification information of a user who has accessed the work vehicle; and a fraudulence determination unit that is configured to compare the identification information related to the access information with the identification information related to the distribution information to determine whether or not there is fraudulent access.

Advantageous Effects of Invention

According to at least one aspect of the aspects shown in embodiments, a communication monitoring device can detect fraudulent access to a work vehicle.

BRIEF DESCRIPTION OF DRAWINGS

FIG. 4 is a diagram showing an example of information stored in a setting information storage unit according to the first embodiment.

FIG. 5 is a diagram showing an example of information stored in a user information storage unit according to the first embodiment.

FIG. 6 is a diagram showing an example of information stored in a distribution information storage unit according to the first embodiment.

BEST MODE FOR CARRYING OUT THE INVENTION

First Embodiment

<<Configuration of Communication Monitoring System>>

Figure 1:
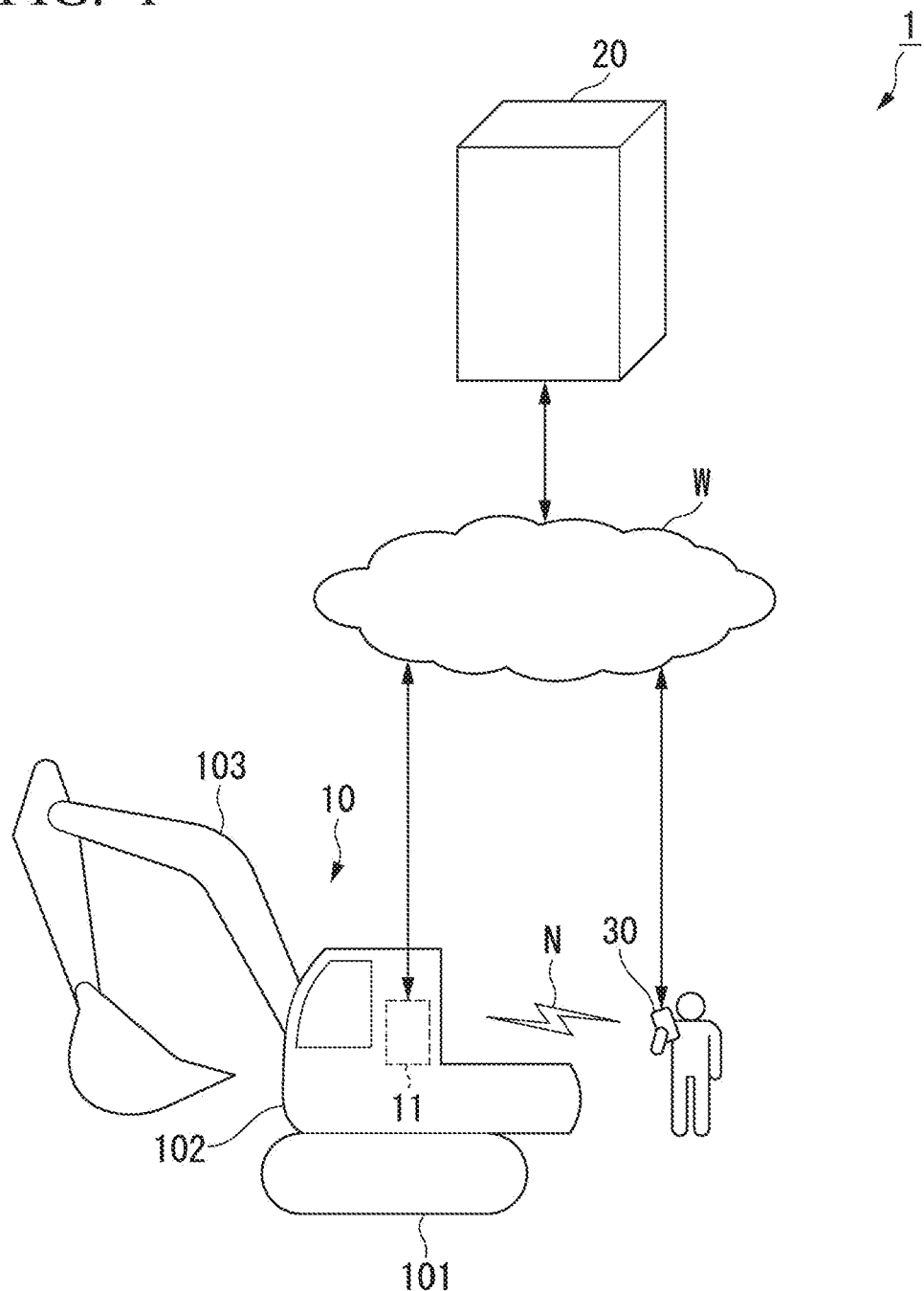
FIG. 1 is a schematic diagram showing a configuration of a communication monitoring system according to a first embodiment.

FIG. 1 is a schematic diagram illustrating a configuration of a communication monitoring system according to a first embodiment.

The communication monitoring system 1 according to the first embodiment includes a work vehicle 10 and a communication monitoring device 20. In addition, although the work vehicle 10 related to the first embodiment is a hydraulic shovel, in other embodiments, the work vehicle 10 may be other work vehicles, such as a wheel loader.

<<Configuration of Work Vehicle>>

The work vehicle 10 includes a traveling body 101, a main body 102, and a work equipment 103. The main body 102 is provided with a driver's seat on which an operator is boarded. The driver's seat is provided with an operation mechanism (not shown) such as a lever for an operator to input an operation and a work vehicle control device 11. The operation mechanism may receive an input from a remote through a wide area network W or the like. In other words, the work vehicle 10 may be a remote driving vehicle or a machine including a traveling body that performs autonomous driving.

The work equipment 103 includes a drive mechanism such as a cylinder and a digging function such as a bucket driven by the drive mechanism. The work vehicle 10 is provided with sensors (not shown) that acquire operation information such as position information, work equipment operation information, work equipment attitude information, and fuel information.

<<Configuration of Work Vehicle Control Device>>

Figure 2:
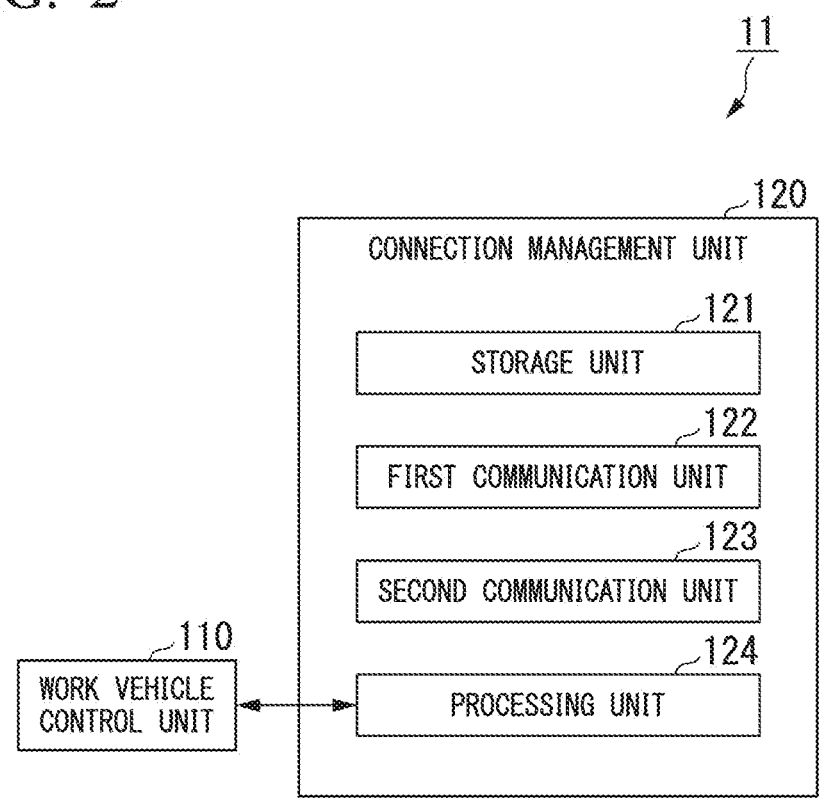
FIG. 2 is a schematic block diagram showing a configuration of a work vehicle control device according to the first embodiment.

FIG. 2 is a schematic block diagram showing a configuration of a work vehicle control device according to the first embodiment.

The work vehicle control device 11 includes a work vehicle control unit 110 that controls the work vehicle 10, and a connection management unit 120 that manages connection information of the work vehicle 10. The work vehicle control unit 110 and the connection management unit 120 may be implemented on the same computer or on separate computers.

The work vehicle control unit 110 acquires operation information from sensors (not shown) provided in the work vehicle 10 and manages the operation state of the work vehicle 10. In addition, the work vehicle control device 11 receives an operator's operation and input of operation information, and controls the work vehicle 10 according to these. The connection management unit 120 of the work vehicle control device 11 communicates with the communication monitoring device 20 and the terminal device 30 possessed by a user such as an operator, and takes charge of connection management of the terminal device 30.

For example, the work vehicle 10 transmits the operation information of the work vehicle 10 to the terminal device 30, and receives a selection command, an input, and the like for collecting the operation information of the work vehicle 10 from the terminal device 30.

The connection management unit 120 functions as an access point for the short-range wireless communication N and accepts access from the terminal device 30 possessed by the user such as the operator. Examples of the short-range wireless communication N include a wireless local area network (LAN), Bluetooth (registered trademark), and Zigbee (registered trademark). The connection management unit 120 includes a storage unit 121, a first communication unit 122, a second communication unit 123, and a processing unit 124.

The storage unit 121 stores setting information of the short-range wireless communication N transmitted from the communication monitoring device 20 (for example, in the case of a wireless LAN, a combination of a service set identifier (SSID) indicating an access point identification name and an encryption key), and access information representing the history of access by the short-range wireless communication N.

The first communication unit 122 receives setting information from the communication monitoring device 20 through the wide area network W (for example, a mobile communication network). The first communication unit 122 transmits access information indicating the access received by the second communication unit 123 from the terminal device 30 to the communication monitoring device 20.

The second communication unit 123 functions as an access point for the short-range wireless communication N. The second communication unit 123 receives the setting information and the user ID from the terminal device 30 through the short-range wireless communication N.

The processing unit 124 determines whether or not the terminal device 30 can be connected by the short-range wireless communication N, according to the setting information stored in the storage unit 121. When the processing unit 124 permits the connection of the terminal device 30 by the short-range wireless communication N, the processing unit 124 transmits the operation information managed by the work vehicle control unit 110 to the terminal device 30 through the second communication unit 123.

<<Configuration of Communication Monitoring Device>>

The communication monitoring device 20 manages setting information of the work vehicle control device 11, and monitors communication between the work vehicle control device 11 and the terminal device 30 possessed by the user such as the operator.

The work vehicle control device 11 and the communication monitoring device 20 are connected through the wide area network W. The terminal device 30 and the communication monitoring device 20 are connected through the wide area network W. The communication monitoring device 20 registers and changes setting information in the work vehicle control device 11 through the wide area network W. The communication monitoring device 20 notifies the authorized user of the setting information of the work vehicle control device 11 through the wide area network W. That is, the work vehicle control device 11 communicates with the terminal device 30 possessed by the user who has been notified of the setting information by the communication monitoring device 20.

By communicating with the work vehicle control device 11 by the short-range wireless communication N, the terminal device 30 can acquire the operation state from the work vehicle control device 11 without depending on a communication environment of the wide area network W, and sets parameters in the work vehicle control device 11.

On the other hand, when an unauthorized person obtains the setting information fraudulently, the unauthorized person may acquire the operating state fraudulently from the work vehicle control device 11 and set parameters fraudulently. Therefore, the communication monitoring device 20 monitors communication between the work vehicle control device 11 and the terminal device 30, and detects fraudulent access by an unauthorized person.

Figure 3:
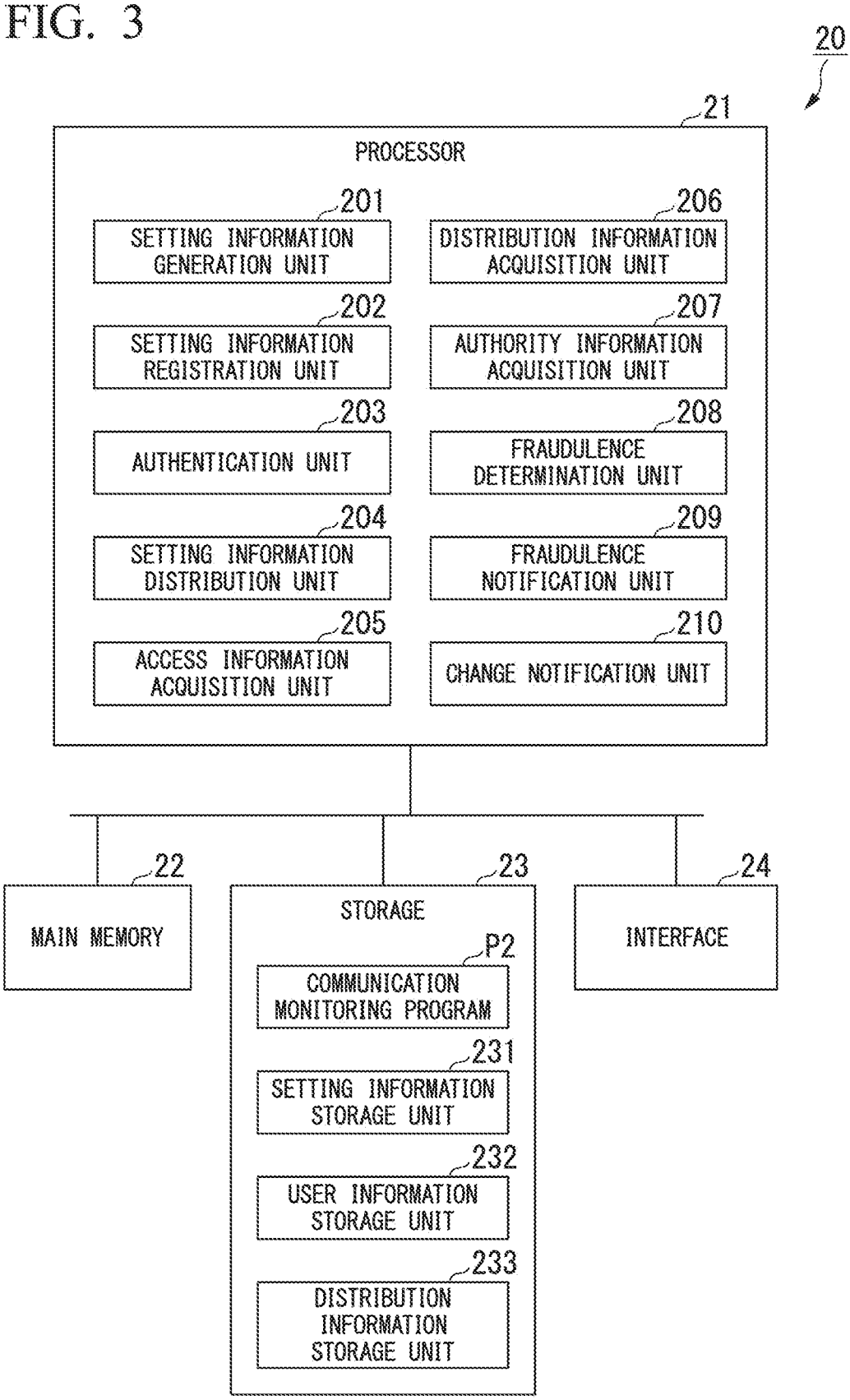
FIG. 3 is a schematic block diagram showing a configuration of a communication monitoring device according to the first embodiment.

FIG. 3 is a schematic block diagram showing a configuration of the communication monitoring device according to the first embodiment.

The communication monitoring device 20 is a computer including a processor 21, a main memory 22, a storage 23, and an interface 24. The storage 23 stores a communication monitoring program P2. The processor 21 reads the communication monitoring program P2 from the storage 23, expands it in the main memory 22, and executes processing according to the communication monitoring program P2. The communication monitoring device 20 is connected to the wide area network W through the interface 24. Further, the communication monitoring device 20 is connected to an input and output device (not shown) through the interface 24.

Examples of the storage 23 include a hard disk drive (HDD), a solid state drive (SSD), a magnetic disk, a magneto-optical disk, a compact disc read only memory (CD- ROM), a digital versatile disc read only memory (DVD-ROM), and a semiconductor memory. The storage 23 may be an internal medium directly connected to the bus of the communication monitoring device 20, or may be an external medium connected to the communication monitoring device 20 through the interface 24. The storage 23 is a non-transitory tangible storage medium.

The storage 23 has storage areas as a setting information storage unit 231, a user information storage unit 232, and a distribution information storage unit 233.

FIG. 4 is a diagram showing an example of information stored in the setting information storage unit 231 according to the first embodiment.

The setting information storage unit 231 stores information on the work vehicle 10 belonging to the management group, for each management group that manages the work vehicle 10. Examples of management groups include construction companies and construction sites. The setting information registered in the work vehicle control device 11 of the work vehicle 10 is stored in association with the work vehicle ID for identifying the work vehicle 10. For example, the setting information storage unit 231 stores a setting information ID for identifying setting information, an SSID, and an encryption key in association with the work vehicle ID. The setting information ID is updated every time the communication monitoring device 20 changes the setting information of the work vehicle control device 11.

FIG. 5 is a diagram showing an example of information stored by the user information storage unit 232 according to the first embodiment.

The user information storage unit 232 stores information of users belonging to the management group for each management group. The user information storage unit 232 stores a password used for authentication, authority information indicating an access authority to the work vehicle control device 11, and an mail address in association with a user ID for identifying the user. For example, any of administrator authority, manager authority, and user authority is set in the authority information. The user having the administrator authority is, for example, a person who provides maintenance and service of the work vehicle 10. The administrator authority is the authority capable of performing access to the work vehicle control device 11, setting and updating the access authority to the work vehicle control device 11, and instructing update of the setting information. The user having manager authority is, for example, the owner of the work vehicle. The user information storage unit 232 stores the work vehicle ID of the work vehicle owned by the user in association with the user having manager authority. The manager authority is an authority capable of instructing the owner of the work vehicle 10 to access the work vehicle control device 11, to set and update access authority to the work vehicle control device 11, and to update the setting information. The user having the user authority is, for example, an operator of the work vehicle 10. The user authority is an authority that allows access to the work vehicle control device 11.

When users are excluded from the management group due to retirement or transfer, information related to the users is deleted from the user information storage unit 232. In addition, "delete" includes not only deleting data but also leaving user information without access authority for considering deleted.

FIG. 6 is a diagram showing an example of information stored in the distribution information storage unit 233 according to the first embodiment.

The distribution information storage unit 233 stores distribution information indicating a distribution history of setting information to users. In other words, the distribution information storage unit 233 stores the user ID related to the user to whom the setting information ID is distributed in association with the work vehicle ID and the setting information ID.

The processor 21 a setting information generation unit 201, a setting information registration unit 202, an authentication unit 203, a setting information distribution unit 204, an access information acquisition unit 205, a distribution information acquisition unit 206, an authority information acquisition unit 207, a fraudulence determination unit 208, a fraudulence notification unit 209, and a change notification unit 210, which are executed by the communication monitoring program P2.

The setting information generation unit 201 generates setting information used for the short-range wireless communication N, according to an instruction from a user having administrator authority.

The setting information registration unit 202 transmits a registration instruction of setting information including the setting information generated by the setting information generation unit 201, to the work vehicle control device 11. When the work vehicle control device 11 mounted on the work vehicle 10 is replaced by maintenance or the like, the setting information registration unit 202 registers the setting information registered in the work vehicle control device 11 before replacement in the work vehicle control device 11 after the replacement. Further, the setting information registration unit 202 stores the setting information generated by the setting information generation unit 201 in the setting information storage unit 231.

The authentication unit 203 receives the input user ID and password from the terminal device 30 and performs user authentication processing. The authentication unit 203 registers or updates the user information stored in the user information storage unit 232, according to an instruction from a user having administrator authority.

The setting information distribution unit 204 distributes the setting information stored in the setting information storage unit 231 to the user. For example, the setting information distribution unit 204 transmits the setting information, to a mail address stored in association with the authenticated user by the user information storage unit 232. When transmitting the setting information, the setting information distribution unit 204 updates the distribution information stored by the distribution information storage unit 233, according to the user ID related to the user as the transmission destination, the setting information ID of the transmitted setting information, and the work vehicle ID of the work vehicle 10 related to the setting information.

Figures 7, 8:
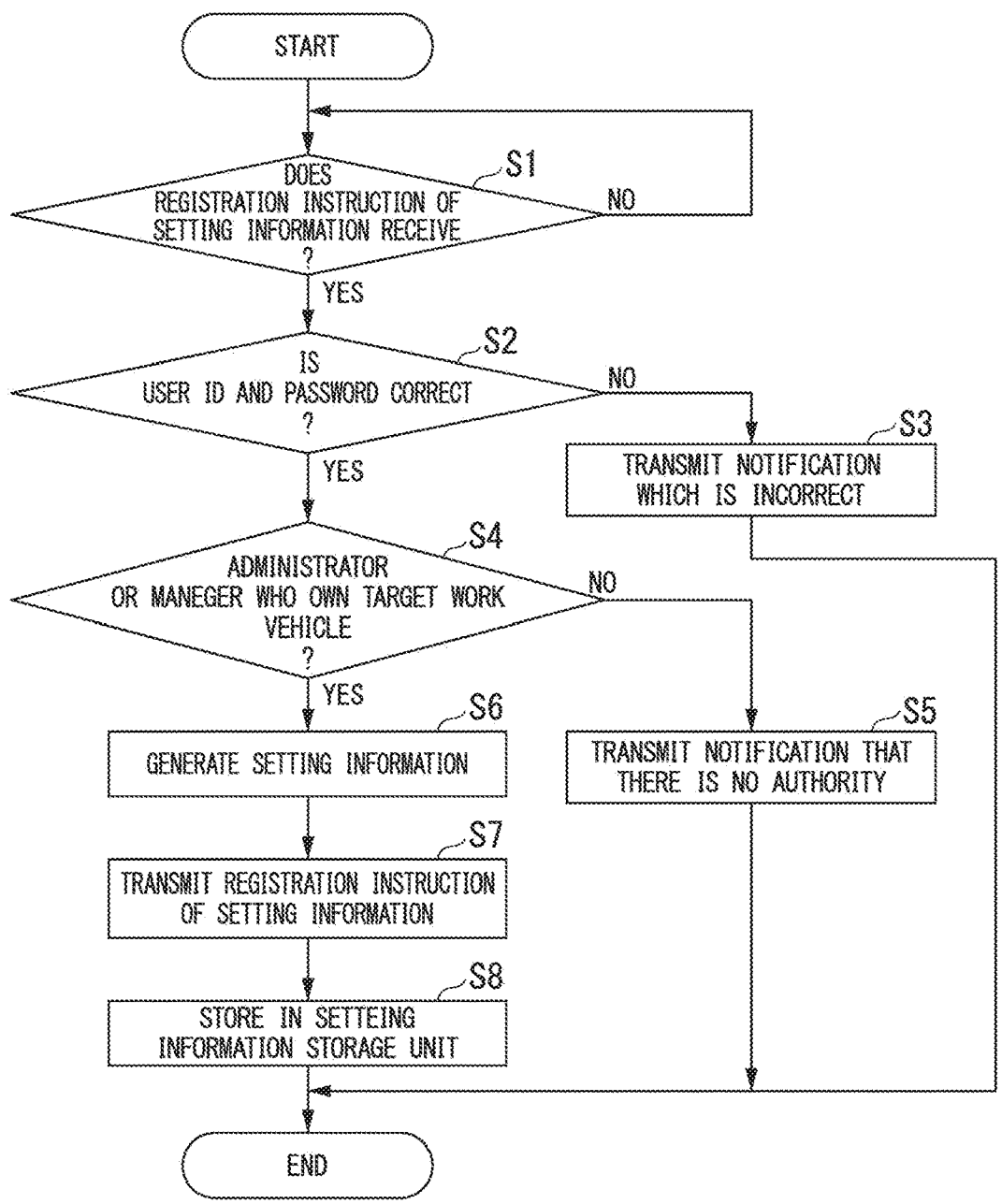
FIG. 7 is a diagram showing an example of access information according to the first embodiment.
FIG. 8 is a flowchart showing setting information registration processing according to the first embodiment.

The access information acquisition unit 205 acquires access information, which is the history of an access to the work vehicle control device 11 by the terminal device 30, from the work vehicle control device 11. FIG. 7 is a diagram showing an example of access information according to the first embodiment. For example, the access information is information in which an access time, a user ID, and communication contents are stored in association with each access.

The distribution information acquisition unit 206 acquires, from the distribution information storage unit 233, distribution information related to the latest setting information of the work vehicle control device 11 that is the transmission source of the access information.

The authority information acquisition unit 207 acquires, from the user information storage unit 232, authority information associated with the user ID included in the access information.

The fraudulence determination unit 208 determines whether there is any fraudulent access to the work vehicle control device 11, according to the access information acquired by the access information acquisition unit 205, the distribution information acquired by the distribution information acquisition unit 206, and the authority information acquired by the authority information acquisition unit 207.

When the fraudulence determination unit 208 determines that there is a fraudulent access, the fraudulence notification unit 209 transmits a fraudulent access occurrence notification to the user having administrator authority.

When the setting information is changed, the change notification unit 210 transmits a setting information change notification to the user of the distribution destination of the setting information before the change.

<<Configuration of Terminal Device>>

The terminal device 30 is a portable terminal such as a smartphone or a tablet, and has an input function, a communication function, a display function, and a storage function. The terminal device 30 functions as a slave unit of the wide area network W and the short-range wireless communication N by using a communication function. The terminal device 30 stores the user ID and setting information transmitted from the communication monitoring device 20, by the storage function. The terminal device 30 displays the operation information of the work vehicle 10 received from the work vehicle control device 11, by the display function.

<<Operation of Communication Monitoring System>>

FIG. 8 is a flowchart showing setting information registration processing according to the first embodiment.

When the work vehicle 10 to be monitored by the communication monitoring device 20 is added, the work vehicle 10 is registered with the setting information used for the short-range wireless communication N. A user having administrator authority accesses the communication monitoring device 20 through the wide area network W using the terminal device 30. At this time, the user having administrator authority inputs, to the terminal device 30, the user ID and password related to the user information registered in the communication monitoring device 20 and the work vehicle ID of the target work vehicle 10. The terminal device 30 transmits to the communication monitoring device 20, a registration instruction of setting information including a user ID, a password, and a work vehicle ID.

The authentication unit 203 of the communication monitoring device 20 determines whether or not a registration instruction of setting information has been acquired from the terminal device 30 (step S1). When the authentication unit 203 does not acquire the registration instruction (step S1: NO), the authentication unit 203 repeats the determination in step S1. On the other hand, when the authentication unit 203 acquires the registration instruction (step S1: YES), the authentication unit 203 collates the combination of the user ID and the password included in the registration instruction with the combination of the user ID and the password stored in the user information storage unit 232 to determine whether the acquired combination of the user ID and the password is correct (step S2).

When the combination of the user ID and the password is incorrect (step S2: NO), the authentication unit 203 transmits a notification that the combination of the user ID and the password is incorrect to the terminal device 30 (step S3), and ends the process.

When the combination of the user ID and the password is correct (step S2: YES), the authentication unit 203 determines whether the authority information associated with the user ID indicates the administrator authority, or the authority information indicates the manager authority and is the owner of the work vehicle 10 as a target (step S4). When the authority information related to the user ID does not indicate administrator authority or manager authority, or when the authority information indicates manager authority but is not the owner of the target work vehicle 10 (step S4: NO), the authentication unit 203 transmits to the terminal device 30, a notification that there is no registration authority for setting information (step S5), and ends the process.

When the authority information related to the user ID indicates the administrator authority, or the authority information indicates the manager authority and is the owner of the work vehicle 10 as a target (step S4: YES), the setting information generation unit generates the setting information used for the short-range wireless communication N for the work vehicle 10 (step S6). At this time, the setting information generation unit 201 generates a setting information ID that is identification information unique to the generated setting information. Next, the setting information registration unit 202 transmits a registration instruction for the generated setting information to the work vehicle 10 indicated by the work vehicle ID included in the registration instruction through the wide area network W (step S7). The registration instruction includes the generated setting information. The setting information registration unit 202 stores the work vehicle ID that is the transmission destination of the registration instruction, the generated setting information ID, and the setting information in association with each other, in the management group associated with the user ID among the management groups stored in the setting information storage unit 231 (step S8).

Thereby, the setting information used for the short-range wireless communication N is registered in the work vehicle 10, and the combination of the work vehicle 10 and the setting information is stored in the communication monitoring device 20.

Figure 9:
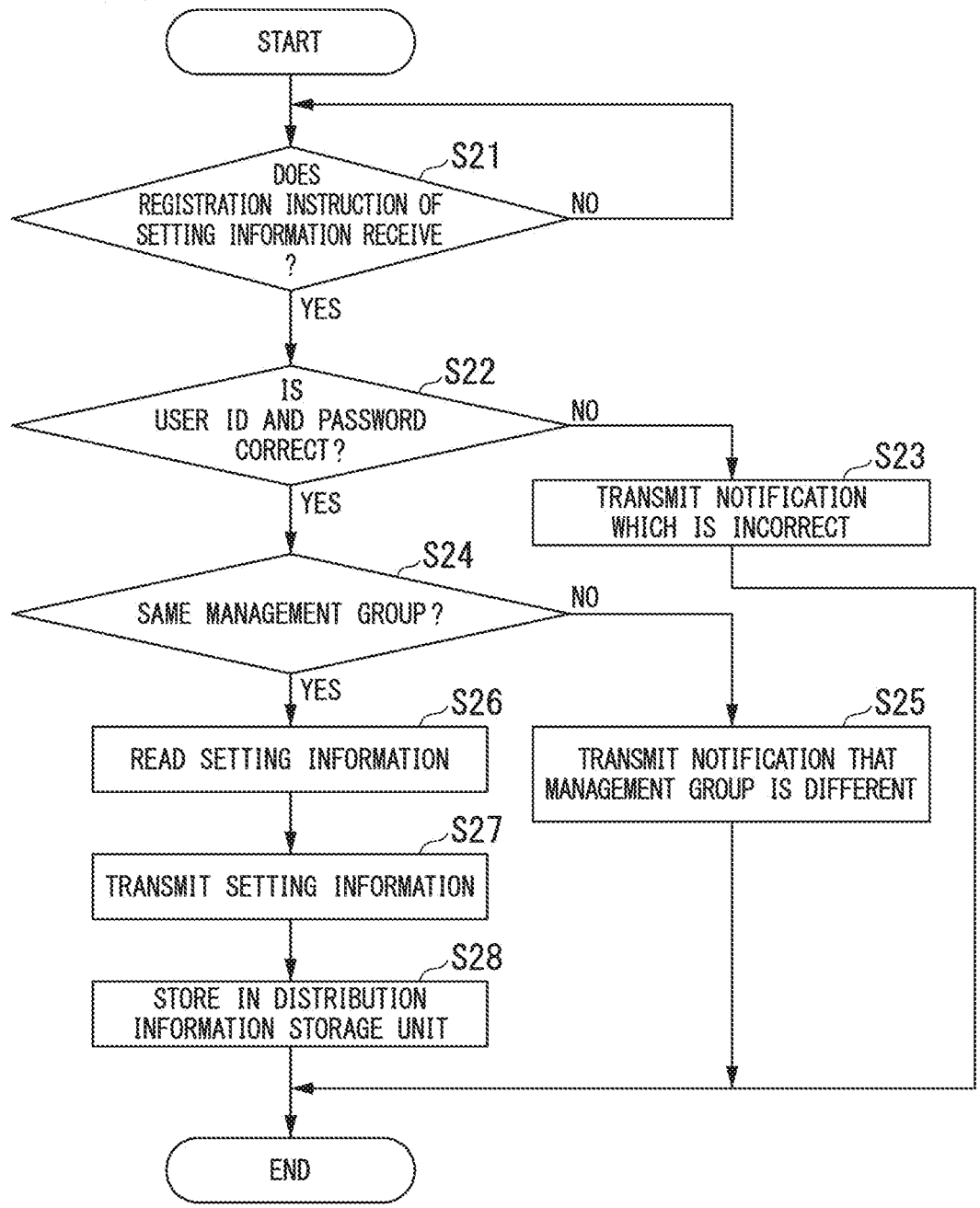
FIG. 9 is a flowchart showing setting information distribution processing according to the first embodiment.

FIG. 9 is a flowchart showing setting information distribution processing according to the first embodiment.

An operator (a user having authority (administrator authority, manager authority, and user authority) permitted to access the work vehicle 10) of the work vehicle 10 needs to acquire the setting information of the work vehicle 10 in order to make the terminal device 30 communicate with the work vehicle 10 by the short-range wireless communication N. The operator accesses the communication monitoring device 20 through the wide area network W, using the terminal device 30 that is to register the setting information. At this time, the operator inputs to the terminal device 30, the user ID and password related to the user information registered in the communication monitoring device 20 and the work vehicle ID of the target work vehicle 10. The terminal device 30 transmits to the communication monitoring device 20, a transmission instruction of setting information including a user ID, a password, and a work vehicle ID.

The authentication unit 203 of the communication monitoring device 20 determines whether or not a transmission instruction of setting information has been received from the terminal device 30 (step S21). When the authentication unit 203 does not receive the transmission instruction (step S21: NO), the authentication unit 203 repeats the determination of step S21. On the other hand, when the authentication unit 203 receives the transmission instruction (step S21: YES), the authentication unit 203 collates the combination of the user ID and the password included in the transmission instruction with the combination of the user ID and the password stored in the user information storage unit 232 to determine whether the acquired combination of the user ID and the password is correct (step S22).

When the combination of the user ID and the password is incorrect (step S22: NO), the authentication unit 203 transmits a notification that the combination of the user ID and the password is incorrect to the terminal device 30 (step S23), and ends the process.

When the combination of the user ID and the password is correct (step S22: YES), the authentication unit 203 determines whether or not the management group associated with the user ID in the user information storage unit 232 matches the management group associated with the work vehicle ID included in the transmission instruction in the setting information storage unit 231 (step S24). That is, the authentication unit 203 determines whether or not the user ID and the work vehicle ID belong to the same management group.

When the user ID and the work vehicle ID do not belong to the same management group (step S24: NO), the authentication unit 203 transmits, to the terminal device 30, a notification that the management group of the work vehicle 10 is different (step S25), and ends the process.

When the user ID and the work vehicle ID belong to the same management group (step S24: YES), the setting information distribution unit 204 reads the setting information associated with the work vehicle ID included in the transmission instruction, from the setting information storage unit 231 (step S26). The setting information distribution unit 204 transmits the read setting information to the terminal device 30 (step S27). The setting information distribution unit 204 stores the user ID included in the transmission instruction in the distribution information storage unit 233 in association with the work vehicle ID included in the transmission instruction and the setting information ID of the setting information read in step S26 (step S28).

Thereby, the setting information of the work vehicle 10 is registered in the terminal device 30 possessed by the operator, and the distribution history of the setting information is stored in the communication monitoring device 20.

Figure 10:
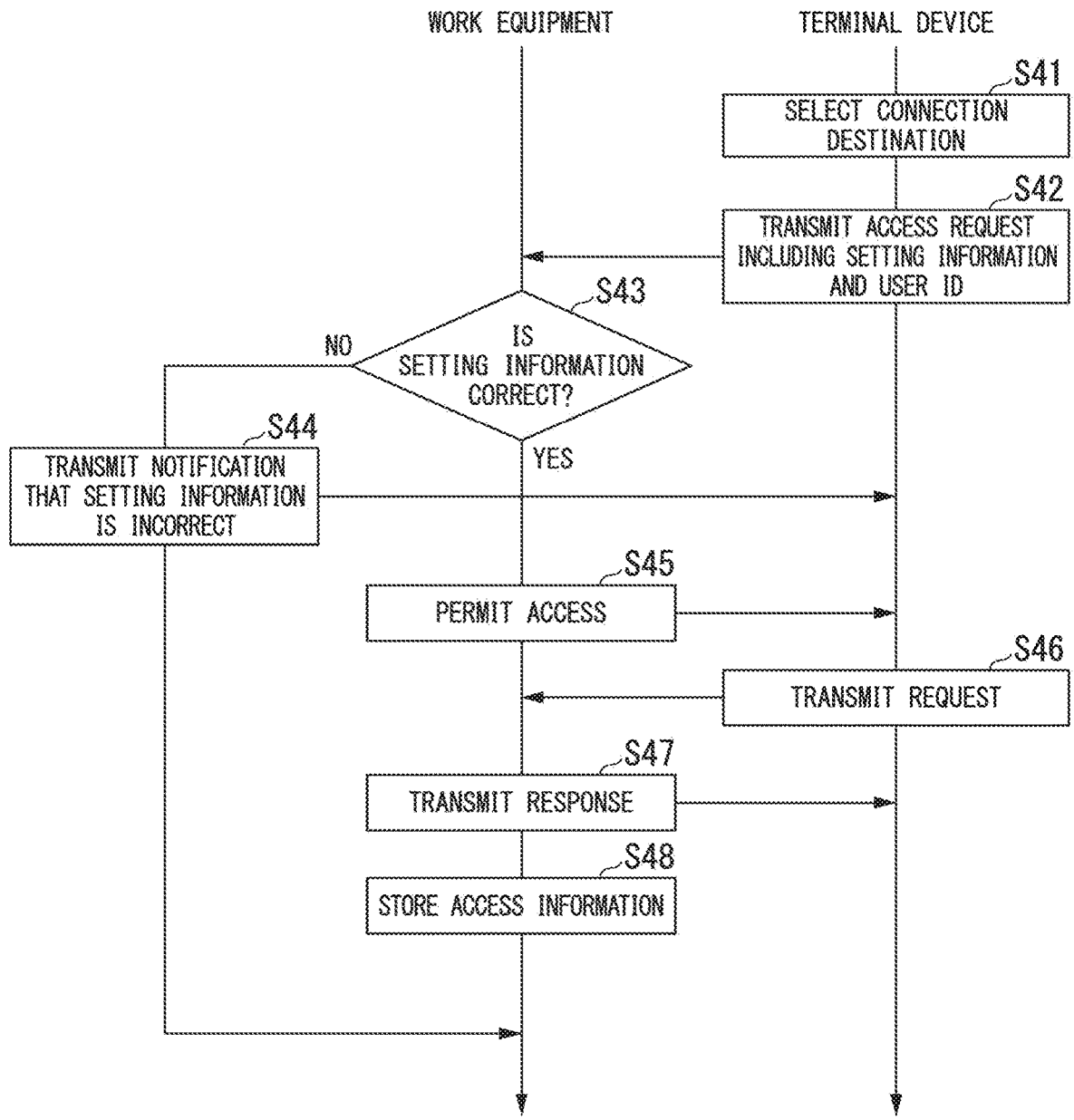
FIG. 10 is a sequence diagram showing communication processing between a work vehicle and a terminal device according to the first embodiment.

FIG. 10 is a sequence diagram showing communication processing between a work vehicle and a terminal device according to the first embodiment.

The operator of the work vehicle 10 operates the terminal device 30 to select the connection destination work vehicle 10 in order to connect the terminal device 30 and the work vehicle 10 by the short-range wireless communication N (step S41). The terminal device 30 reads the setting information related to the selected work vehicle 10 from the internal storage device, and transmits an access request including the setting information and the user ID to the work vehicle 10 by the short-range wireless communication N (step S42). When receiving the access request, the work vehicle control device 11 of the work vehicle 10 collates the setting information included in the access request with the setting information registered in the work vehicle control device 11 to determine whether the setting information is correct or not (step S43). When the setting information is incorrect (step S43: NO), the work vehicle control device 11 transmits a notification that the setting information is incorrect to the terminal device 30 (step S44), and ends the process.

On the other hand, when the setting information is correct (step S43: YES), the work vehicle control device 11 permits access from the terminal device 30 (step S45). Thereafter, the terminal device 30 transmits the input (request) of the operation information collection command or the selection command according to the operation of the operator, to the work vehicle control device 11, by the short-range wireless communication N (step S46). In response to the request from the terminal device 30, the work vehicle control device 11 transmits the operation information being collected and a message (response) to the operator to the terminal device 30 by the short-range wireless communication N (step S47). At this time, the work vehicle control device 11 stores the access information in which the user ID is associated with the contents of the request and the response in the internal storage device (step S48).

The work vehicle control device 11 transmits access information to the communication monitoring device 20 through the wide area network W. The access information may not necessarily be transmitted every time access is performed from the terminal device 30. For example, the work vehicle control device 11 may collectively transmit access information related to access from the terminal device 30 within the time period at regular time intervals. For example, when the connection to the wide area network W is possible, the work vehicle control device 11 may collectively transmit the access information related to the access from the terminal device 30 while the connection to the wide area network W is not possible.

Figure 11:
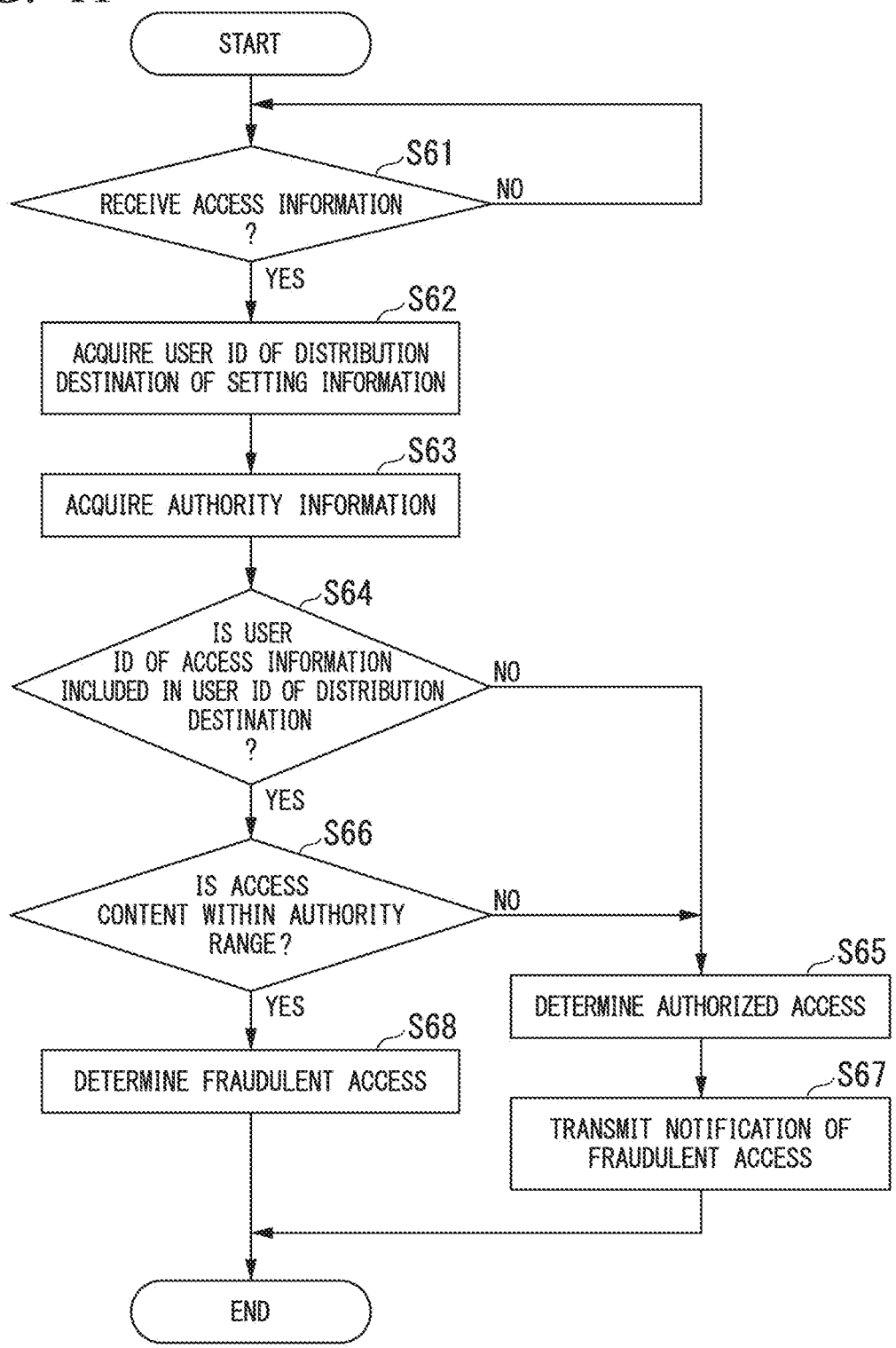
FIG. 11 is a flowchart showing fraudulent access detection processing according to the first embodiment.

FIG. 11 is a flowchart showing fraudulent access detection processing according to the first embodiment.

When the work vehicle 10 transmits access information, the access information acquisition unit 205 of the communication monitoring device 20 determines whether or not the access information has been received (step S61). When the access information acquisition unit 205 does not receive the access information (step S61: NO), the access information acquisition unit 205 repeats the determination in step S61. On the other hand, when the access information acquisition unit 205 receives the access information (step S61: YES), the distribution information acquisition unit 206 acquires the user ID associated with the latest setting information of the work vehicle 10 of the access information from the distribution information storage unit 233 (step S62). The authority information acquisition unit 207 acquires authority information related to the acquired user ID from the user information storage unit 232 (step S63).

The fraudulence determination unit 208 determines whether or not there is the user ID included in the received access information in the user ID acquired by the distribution information acquisition unit 206 (step S64). When there is no user ID included in the access information among the user IDs acquired by the distribution information acquisition unit 206 (step S64: NO), the fraudulence determination unit 208 determines that the access related to the access information is fraudulent access (step S65). That is, it is determined that the access related to the access information is not an access by an authorized user to whom the setting information is distributed.

When there is the user ID included in the access information among the user IDs acquired by the distribution information acquisition unit 206 (step S64: YES), the fraudulence determination unit 208 determines whether or not the access content is within the authority range of the user, according to the access contents related to the access information and the authority information of the user (step S66). For example, the fraudulence determination unit 208 stores the access contents permitted for each authority information, and when the access contents related to the access information exceed the permitted access contents, the fraudulence determination unit 208 determines that the access contents exceed the authority range of the user. For example, the fraudulence determination unit 208 may determine whether the access contents exceed the authority range of the user, by inputting the access contents related to the access information and the authority information acquired in step S63 to the learned model learned according to the authority information and the access contents.

When the access contents exceed the authority range of the user (step S66: NO), the fraudulence determination unit 208 determines that the access related to the access information is a fraudulent access (step S65).

When it is determined that the access related to the access information is a fraudulent access, the fraudulence notification unit 209 transmits a notification that fraudulent access has been detected to the mail address of the user having administrator authority (that is, an administrator) associated with the management group to which the work vehicle 10 that is the transmission source of the access information belongs (step S67). The notification that fraudulent access has been detected includes a message for urging the change of the setting information.

On the other hand, when there is the user ID included in the access information among the user IDs acquired by the distribution information acquisition unit 206, and the access contents do not exceed the authority range of the user (step S66: YES), the fraudulence determination unit 208 determines that the access related to the access information is authorized access (step S68). When it is determined that the access related to the access information is authorized access, the fraudulence notification unit 209 does not transmit a notification.

When the user having administrator authority receives notification that fraudulent access has been detected by mail, the user determines whether or not the setting information is to be changed. When it is determined that the setting information is to be changed, the user having administrator authority transmits a setting information change instruction, by using the terminal device 30 or the like. The change instruction includes a user ID, a password, and a work vehicle ID.

Figure 12:
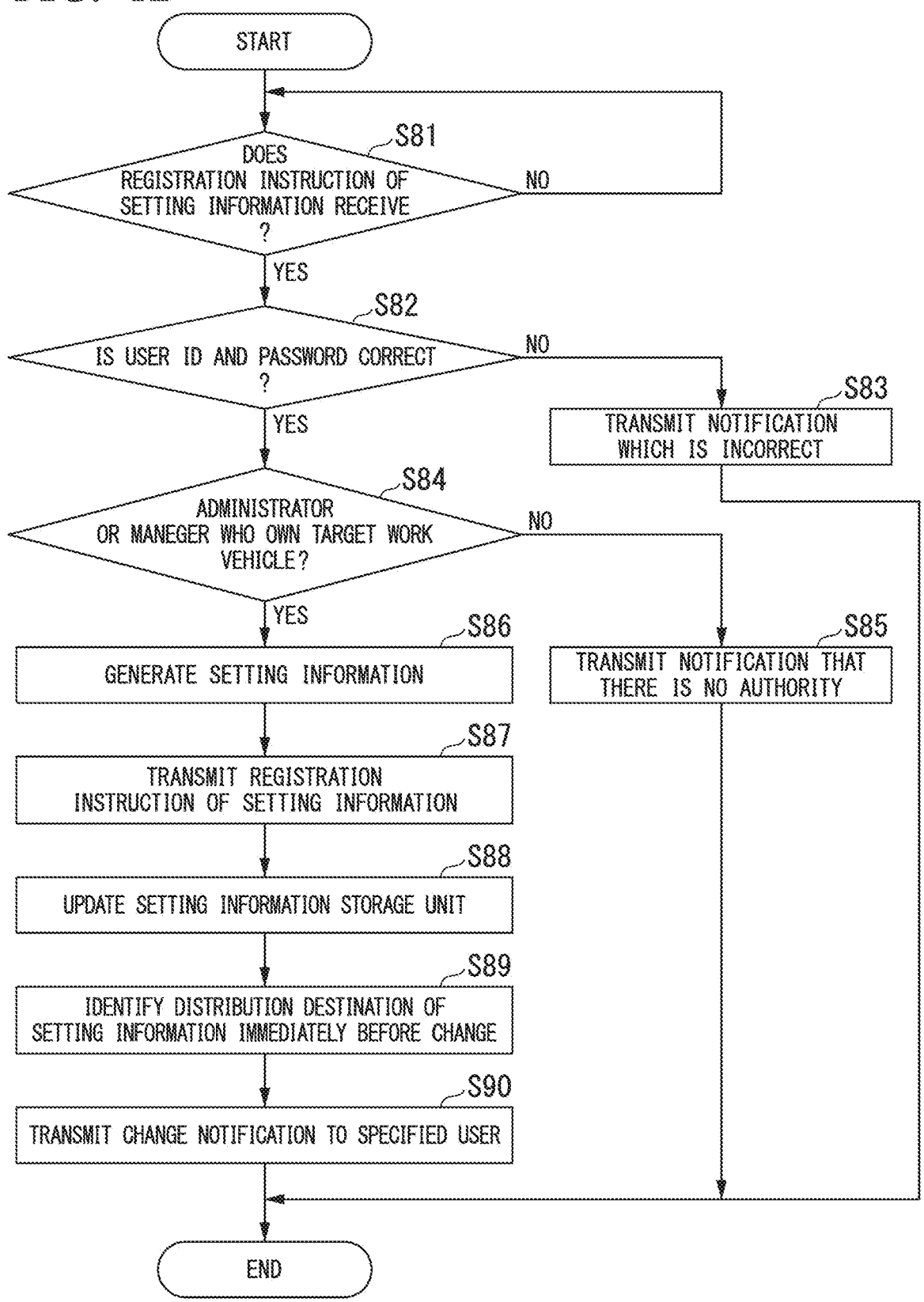
FIG. 12 is a flowchart showing setting information change processing according to the first embodiment.

FIG. 12 is a flowchart showing setting information change processing according to the first embodiment.

The authentication unit 203 of the communication monitoring device 20 determines whether or not a change instruction of setting information has been received from the terminal device 30 (step S81). When the authentication unit 203 does not receive the change instruction (step S81: NO), the authentication unit 203 repeats the determination in step S81. On the other hand, when the authentication unit 203 receives the change instruction (step S81: YES), the authentication unit 203 collates the combination of the user ID and the password included in the change instruction with the combination of the user ID and the password stored in the user information storage unit 232 to determine whether the acquired combination of the user ID and the password is correct (step S82).

When the combination of the user ID and the password is incorrect (step S82: NO), the authentication unit 203 transmits a notification that the combination of the user ID and the password is incorrect to the terminal device 30, and ends the process (step S83).

When the combination of the user ID and the password is correct (step S82: YES), the authentication unit 203 determines whether the authority information associated with the user ID indicates the administrator authority, or the authority information indicates the manager authority and is the owner of the work vehicle 10 as a target (step S84). When the authority information related to the user ID does not indicate administrator authority or manager authority, or when the authority information indicates manager authority but is not the owner of the target work vehicle 10 (step S84: NO), the authentication unit 203 transmits to the terminal device 30, a notification that there is no registration authority for setting information (step S85), and ends the process.

When the authority information related to the user ID indicates the administrator authority, or the authority information indicates the manager authority and is the owner of the work vehicle 10 as a target (step S84: YES), the setting information generation unit 201 generates new setting information (step S86). At this time, the setting information generation unit 201 generates a setting information ID that is identification information unique to the generated setting information. Next, the setting information registration unit 202 transmits an instruction to change the generated setting information to the work vehicle 10 indicated by the work vehicle ID included in the registration instruction through the wide area network W (step S87). The change instruction includes the generated setting information. The setting information registration unit 202 rewrites the setting information ID and the setting information stored in the setting information storage unit 231 and the storage unit 121 in association with the work vehicle ID that is the transmission destination of the change instruction with the setting information ID and the setting generated in step S86 (step S88).

The change notification unit 210 identifies the user ID associated with the setting information ID of the setting information immediately before the change, from the distribution information storage unit 233 (step S89). The change notification unit 210 reads the mail address associated with the identified user ID from the user information storage unit 232, and transmits a setting information change notification using the mail address as a destination (step S90). Thereby, the user who has accessed the work vehicle 10 using the setting information immediately before the change can know that the setting information of the work vehicle 10 has been changed. When users are excluded from the management group, the information related to the users is deleted from the user information storage unit 232, so the setting information change notification is not transmitted to the users who are already excluded from the management group, among users related to the user ID associated with the setting information ID of the setting information immediately before the change. Thus, it is possible to prevent users who are excluded from the management group from acquiring the changed setting information.

<<Action and Effect>>

As described above, the communication monitoring device 20 according to the first embodiment compares the distribution information including the user ID of the distribution destination of the setting information related to the work vehicle 10 and the access information including the user ID of the user who has accessed the work vehicle 10 to determine whether or not fraudulent access has occurred. Thereby, the communication monitoring device 20 can detect fraudulent access to the work vehicle 10 by the user to whom the setting information is not distributed.

Further, when it is determined that there is fraudulent access, the communication monitoring device 20 according to the first embodiment transmits a fraudulent access occurrence notification to the administrator. Thereby, the administrator can recognize the presence or absence of fraudulent access. In other embodiments, a fraudulent access occurrence notification may be transmitted to a user other than the administrator. In other embodiments, a fraudulent access occurrence notification may not be necessarily transmitted.

Further, the communication monitoring device 20 according to the first embodiment determines whether or not fraudulent access has occurred, according to the authority information indicating the access authority to the work vehicle and the access contents included in the access information. Thus, the communication monitoring device 20 can detect fraudulent access by a third party using setting information that has been fraudulently acquired, or access beyond a predetermined authority by a user belonging to the management group. In another embodiment, the communication monitoring device 20 may detect only fraudulent access according to distribution information, without detecting fraudulent access according to authority information.

Further, the communication monitoring device 20 according to the first embodiment changes the setting information according to the setting information change instruction, and transmits a setting information change notification to the user related to the distribution information. Thus, when the setting information is changed due to the occurrence of fraudulent access or the like, the change of the setting information can be notified to an authorized user who has been accessing using the setting information until then.

Further, according to the first embodiment, when an administrator having administrator authority instructs to update the setting information, the communication monitoring device 20 distributes the new setting information to the currently registered authorized user and the work vehicle control device. Thereby, the communication monitoring device 20 can prevent the work vehicle control device 11 from accepting access by an unauthorized user.

Second Embodiment

The work vehicle control device 11 according to the first embodiment determines whether or not access is possible by collating the setting information. On the other hand, the work vehicle control device 11 according to the second embodiment acquires distribution information from the communication monitoring device 20, and determines whether or not access is possible using the distribution information in addition to the collation of the setting information. A description of portions related to the configuration common to the first embodiment is omitted.

Figure 13:
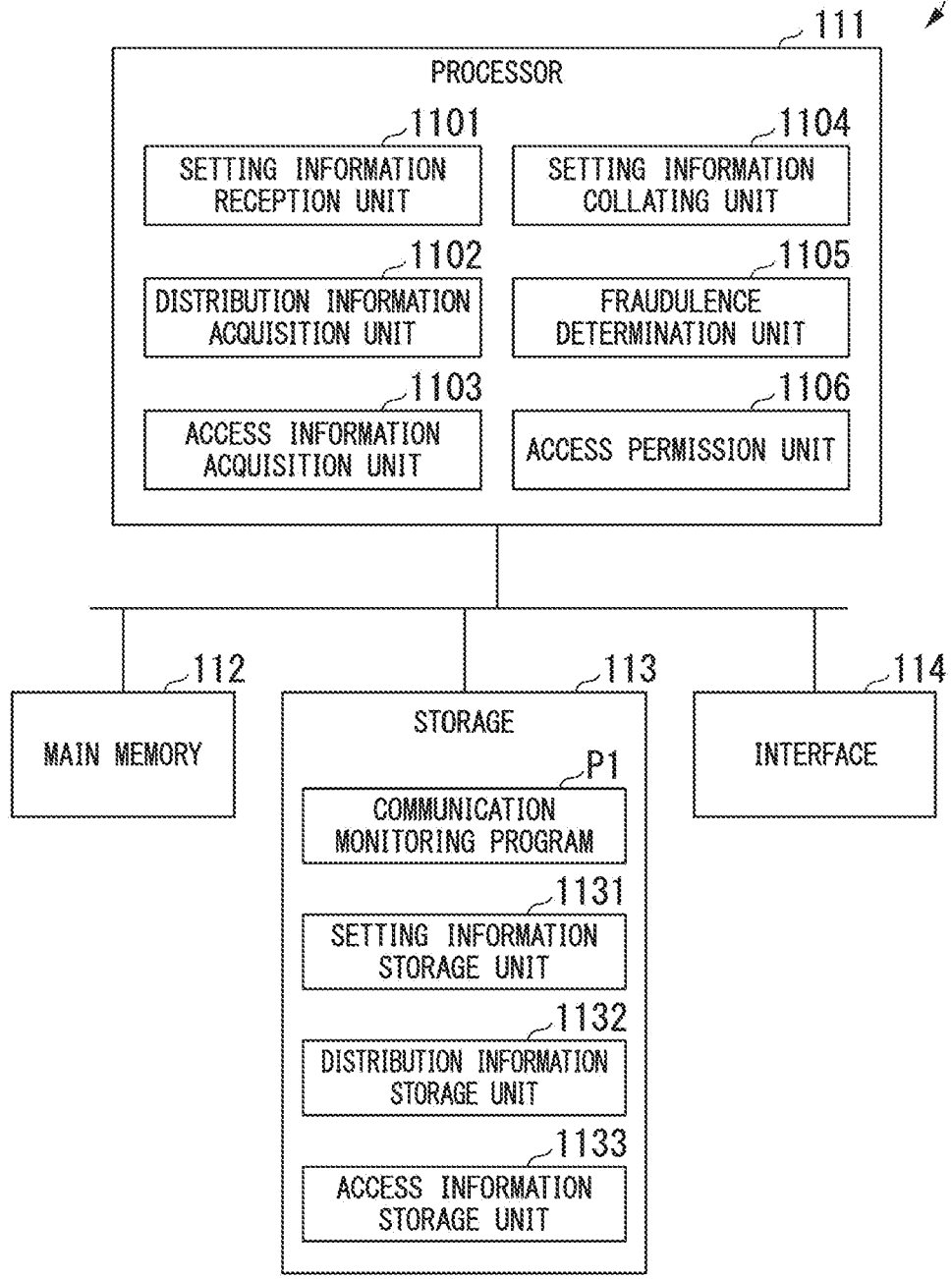
FIG. 13 is a schematic block diagram showing a configuration of a work vehicle control device according to a second embodiment.

FIG. 13 is a schematic block diagram showing a configuration of a work vehicle control device according to a second embodiment.

The work vehicle control device 11 according to the second embodiment is a computer including a processor 111, a main memory 112, a storage 113, and an interface 114. The storage 113 stores a communication monitoring program P1. The processor 111 reads the communication monitoring program P1 from the storage 113, expands it in the main memory 112, and executes processing according to the communication monitoring program P1. The work vehicle control device 11 is connected to the wide area network W through the interface 114 and performs communication by the short-range wireless communication N. The work vehicle control device 11 is connected to an input and output device (not shown) through the interface 114.

Examples of the storage 113 include HDDs, SSDs, magnetic disks, magneto-optical disks, CD-ROMs, DVD-ROMs, and semiconductor memories. The storage 113 may be an internal medium directly connected to the bus of the work vehicle control device 11, or may be an external medium connected to the work vehicle control device 11 through the interface 114. The storage 113 is a non-transitory tangible storage medium.

The storage 113 has storage areas as a setting information storage unit 1131, a distribution information storage unit 1132, and an access information storage unit 1133. The setting information storage unit 1131 stores setting information included in the registration instruction received from the communication monitoring device 20. The distribution information storage unit 1132 stores distribution information received from the communication monitoring device 20. The access information storage unit 1133 stores access information in which the access contents from the terminal device 30 is associated with the user ID.

The processor 111 includes a setting information reception unit 1101, a distribution information acquisition unit 1102, an access information acquisition unit 1103, a setting information collating unit 1104, a fraudulence determination unit 1105, and an access permission unit 1106, which are executed by the communication monitoring program P1.

The setting information reception unit 1101 receives the registration instruction and change instruction of setting information from the communication monitoring device 20. The setting information reception unit 1101 stores the setting information included in the received instruction in the setting information storage unit 1131.

The distribution information acquisition unit 1102 acquires distribution information related to the work vehicle control device 11 from the communication monitoring device 20. The distribution information acquisition unit 1102 stores the acquired distribution information in the distribution information storage unit 1132.

The access information acquisition unit 1103 acquires an access request including setting information and a user ID from the terminal device 30. The access request is an example of access information.

The setting information collating unit 1104 collates the setting information included in the access information acquired by the access information acquisition unit 1103 and the setting information stored in the setting information storage unit 1131.

The fraudulence determination unit 1105 determines whether or not there is fraudulent access by collating the user ID included in the access information acquired by the access information acquisition unit 1103 with the distribution information stored in the distribution information storage unit 1132.

When the setting information related to the access information is correct and the setting information is distributed to the user ID included in the access information, the access permission unit 1106 permits access from the terminal device 30. On the other hand, when the fraudulence determination unit 1105 determines that the access from the terminal device 30 is a fraudulent access, the access permission unit 1106 prohibits the access from the terminal device 30. That is, the access permission unit 1106 is an example of an access prohibition unit.

<<Operation of Communication Monitoring System>>

Each time the communication monitoring device 20 distributes the setting information to the terminal device 30, the communication monitoring device 20 transmits the distribution information to the work vehicle 10 related to the setting information. Thereby, the distribution information acquisition unit 1102 of the work vehicle control device 11 maintains the distribution information stored in the distribution information storage unit 1132 in the latest state.

Figure 14:
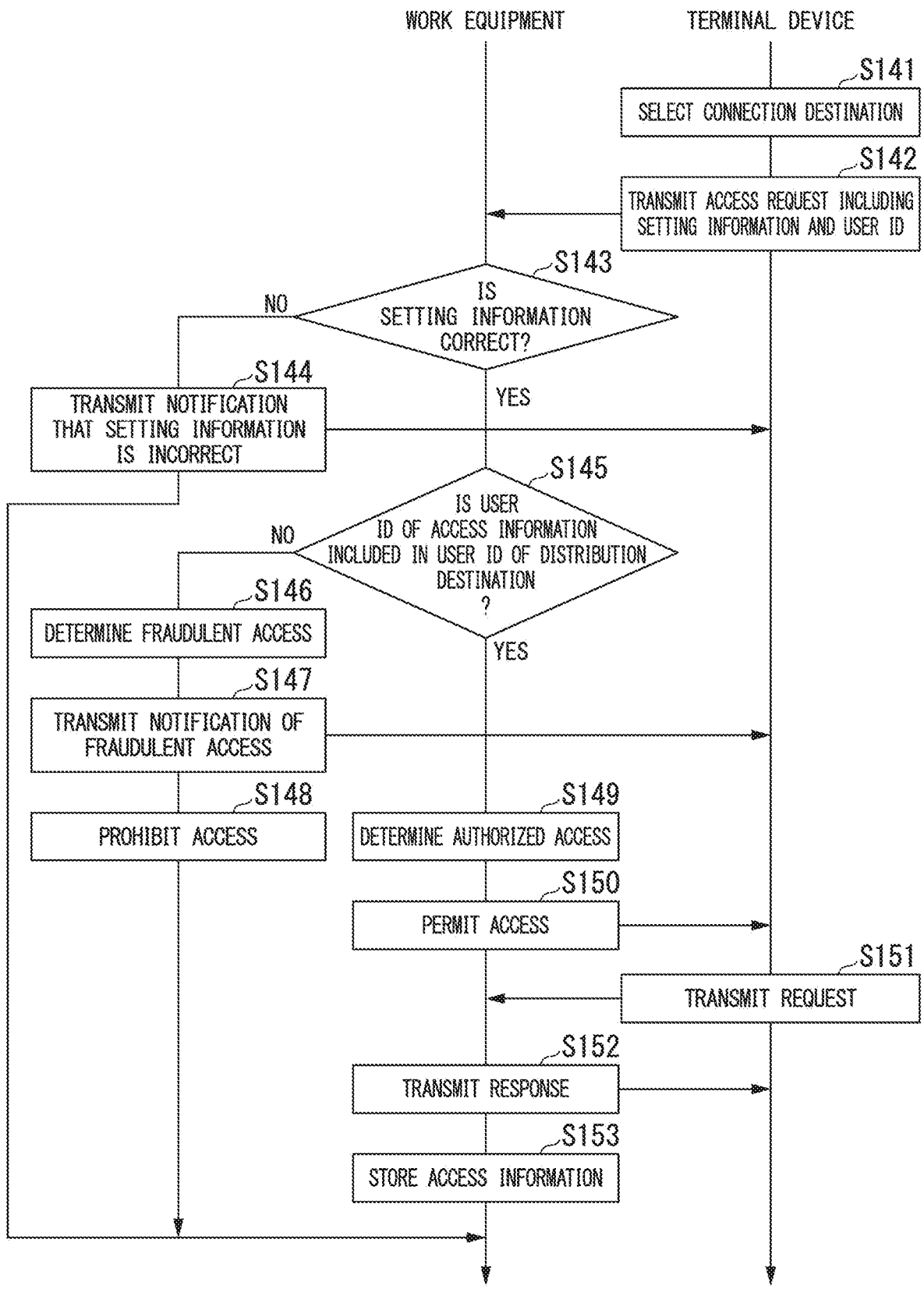
FIG. 14 is a sequence diagram showing communication processing between a work vehicle and a terminal device according to the second embodiment.

FIG. 14 is a sequence diagram showing communication processing between a work vehicle and a terminal device according to the second embodiment.

The operator of the work vehicle 10 operates the terminal device 30 to select the connection destination work vehicle 10 in order to connect the terminal device 30 and the work vehicle 10 by the short-range wireless communication N (step S141). The terminal device 30 reads the setting information related to the selected work vehicle 10 from the internal storage device, and transmits an access request including the setting information and the user ID to the work vehicle 10 by the short-range wireless communication N (step S142). When the access information acquisition unit 1103 of the work vehicle control device 11 acquires the access request, the setting information collating unit 1104 collates the setting information stored in the setting information storage unit 1131 with the setting information included in the access request to determine whether the setting information is correct or not (step S143). When the setting information is incorrect (step S143: NO), the access permission unit 1106 transmits a notification that the setting information is incorrect to the terminal device 30 (step S144), and ends the process without permitting an accesses to the work vehicle control device 11.

On the other hand, when the setting information is correct (step S143: YES), the fraudulence determination unit 1105 determines whether or not the user ID included in the access request is included in the distribution information stored in the distribution information storage unit 1132 (step S145). When the user ID included in the access request is not included in the distribution information (step S145: NO), the fraudulence determination unit 1105 determines that the access is fraudulent access (step S146). The access permission unit 1106 transmits a notification of fraudulent access to the terminal device 30 and the communication monitoring device 20 (step S147), prohibits access to the work vehicle control device 11 (step S148), and ends the process.

On the other hand, when the user ID included in the access request is included in the distribution information (step S145: YES), the fraudulence determination unit 1105 determines that the access is an authorized access (step S149). The access permission unit 1106 permits access from the terminal device 30 (step S150). Thereafter, the terminal device 30 transmits the input (request) of the operation information collection command or the selection command according to the operation of the operator, to the work vehicle control device 11, by the short-range wireless communication N (step S151). In response to the request from the terminal device 30, the work vehicle control device 11 transmits the operation information being collected and a message (response) to the operator to the terminal device 30 by the short-range wireless communication N (step S152). At this time, the work vehicle control device 11 stores the access information in which the user ID is associated with the contents of the request and the response in the internal storage device (step S153).

The work vehicle control device 11 transmits access information to the communication monitoring device 20 through the wide area network W. The access information may not necessarily be transmitted every time access is performed from the terminal device 30. For example, the work vehicle control device 11 may collectively transmit access information related to access from the terminal device 30 within the time period at regular time intervals. For example, when the connection to the wide area network W is possible, the work vehicle control device 11 may collectively transmit the access information related to the access from the terminal device 30 while the connection to the wide area network W is not possible.

<<Action and Effect>>

As described above, the work vehicle control device 11 according to the second embodiment compares the distribution information including the user ID of the distribution destination of the setting information related to the work vehicle 10 and the access request including the user ID of the user who accesses the work vehicle 10 to determine whether or not there is fraudulent access. Thereby, the work vehicle control device 11 can detect fraudulent access to the work vehicle 10 by the user to whom the setting information is not distributed. That is, the work vehicle control device 11 according to the second embodiment functions as a communication monitoring device.

Further, the work vehicle control device 11 according to the second embodiment prohibits the access from the user related to fraudulent access, when it is determined that there is fraudulent access. Thereby, the work vehicle control device 11 can block fraudulent access in advance.

Other Embodiments

As described above, although an embodiment has been described in detail with reference to drawings, a concrete configuration is not limited to the above description, and various design changes or the like are possible.

For example, in the communication monitoring system 1 according to the above-described embodiments, the communication monitoring device 20 creates and distributes setting information and determines fraudulent access, but present invention is not limited thereto. For example, in another embodiment, another device may create and distribute setting information, and the communication monitoring device 20 may determine fraudulent access by acquiring distribution information from the other device.

In the communication monitoring system 1 according to the above-described embodiments, the terminal device 30 accesses the work vehicle 10 using the user ID used for authentication by the communication monitoring device 20, but the present invention is not limited thereto. For example, in another embodiment, the communication monitoring device 20 transmits the notification of another user ID that can uniquely identify the user (for example, the user ID used for authentication is changed by a hash function) when distributing the setting information, the terminal device 30 may access the work vehicle 10 using the other user ID.

Further, although the work vehicle control device 11 and the communication monitoring device 20 related to the embodiments described above are connected to each other through the wide area network W, other embodiments are not limited thereto. For example, the work vehicle control device 11 and the communication monitoring device 20 according to other embodiments may be connected through other communication means such as a wireless LAN.

In the communication monitoring device 20 or the work vehicle control device 11 according to the above-described embodiment, the case where the communication monitoring program is stored in the storage 113 has been described, but the present invention is not limited thereto. For example, in another embodiment, the communication monitoring program may be distributed to the communication monitoring device 20 or the work vehicle control device 11 through a communication line. In this case, the communication monitoring device 20 or the work vehicle control device 11 that has received the distribution expands the communication monitoring program in the main memory and executes the above-described processing.

The communication monitoring program may be for realizing part of the above-described functions. For example, the communication monitoring program may realize the above-described function in combination with another communication monitoring program already stored in the storage, or in combination with another communication monitoring program installed in another device.

Further, the communication monitoring device 20 or the work vehicle control device 11 may include a programmable logic device (PLD) in addition to the above configuration or instead of the above configuration. Examples of PLDs include programmable array logic (PAL), generic array logic (GAL), complex programmable logic device (CPLD), and field programmable gate array (FPGA). In this case, a part of the functions implemented by the processor may be implemented by the PLD.

INDUSTRIAL APPLICABILITY

According to at least one aspect of the aspects shown in embodiments, a communication monitoring device can detect fraudulent access to a work vehicle.

What is claimed is:

1. A communication monitoring device comprising:
   a distribution information acquisition unit that is configured to acquire distribution information including setting information used for access to a work vehicle and first identification information of a user to whom the setting information is distributed;
   an access information acquisition unit that is configured to acquire, from the work vehicle, access information including second identification information of a user who has accessed the work vehicle; and
   a fraudulence determination unit that is configured to compare the second identification information included in the access information with the first identification information included in the distribution information to determine whether or not a fraudulent access to the work vehicle has occurred.

2. The communication monitoring device according to claim 1, further comprising:
   a fraudulence notification unit that is configured to transmit a fraudulent access occurrence notification when it is determined that fraudulent access has occurred.

3. The communication monitoring device according to claim 1, further comprising:
   an authority information acquisition unit that is configured to acquire authority information indicating access authority of the user to the work vehicle,
   wherein the access information includes access contents by the user, and
   wherein the fraudulence determination unit is configured to determine whether or not fraudulent access has occurred, according to the access contents included in the access information and the access authority related to the authority information.

4. The communication monitoring device according to claim 1, further comprising:
   a setting information changing unit that is configured to change the setting information according to an instruction to change the setting information; and
   a change notification unit that is configured to transmit a change notification of the setting information to the user related to the distribution information.

5. The communication monitoring device according to claim 1, further comprising:
   an access prohibition unit that prohibits access from the user related to the fraudulent access, when it is determined that fraudulent access has occurred.

6. The communication monitoring device according to claim 1, wherein the communication monitoring device comprises a processor including the distribution information acquisition unit, the access information acquisition unit, and the fraudulence determination unit.

7. The communication monitoring device according to claim 1, wherein the communication monitoring device is configured to communicate with a terminal device of the user to whom the setting information is distributed, and to permit the user to access the work vehicle.

8. A communication monitoring system comprising:
   a work vehicle; and
   a communication monitoring device that detects a fraudulent access to the work vehicle,
   wherein the communication monitoring device includes a distribution information acquisition unit that is configured to acquire distribution information including first setting information and first identification information of a user to whom the first setting information is distributed,
   wherein the work vehicle includes:
     a storage unit that is configured to store the first setting information transmitted from the communication monitoring device,
     a communication unit configured to accept, from a user, access information including second setting information and second identification information of the user, and to permit access based on the second setting information included in the access information matching the first setting information stored in the storage unit; and
     an access information transmitting unit that is configured to transmit the access information to the communication monitoring device, and
   wherein the communication monitoring device further includes:
     an access information acquisition unit that is configured to acquire the access information from the work vehicle, and
     a fraudulence determination unit that is configured to compare the second identification information included in the access information with the first identification information included in the distribution information to determine whether or not the fraudulent access to the work vehicle has occurred.

9. A communication monitoring method comprising:
   transmitting setting information used for access to a work vehicle to a terminal device that permits access;
   acquiring, from the work vehicle, access information including first identification information of a user who has accessed the work vehicle; and
   transmitting an occurrence notification of a fraudulent access to the work vehicle based on determining that a user not associated with the terminal device, to which the setting information is transmitted, has accessed the work vehicle.

10. The communication monitoring method according to claim 9, further comprising:
    acquiring distribution information including second identification information of a user to whom the setting information is distributed; and comparing the first identification information included in the access information with the second identification information included in distribution information to determine whether or not a fraudulent access to the work vehicle has occurred.

* * * * *